US009481738B2

(12) United States Patent
Narita

(10) Patent No.: US 9,481,738 B2
(45) Date of Patent: Nov. 1, 2016

(54) METHOD FOR PRODUCING CELLULOSE ETHER

(75) Inventor: Mitsuo Narita, Niigata-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 977 days.

(21) Appl. No.: 13/398,247

(22) Filed: Feb. 16, 2012

(65) Prior Publication Data

US 2012/0214983 A1      Aug. 23, 2012

(30) Foreign Application Priority Data

Feb. 21, 2011      (JP) .................................. 2011-034469

(51) Int. Cl.
| C08B 1/08 | (2006.01) |
| C08B 1/06 | (2006.01) |
| C08B 11/02 | (2006.01) |
| C08B 11/00 | (2006.01) |
| C08B 11/193 | (2006.01) |

(52) U.S. Cl.
CPC ................. C08B 1/08 (2013.01); C08B 11/00 (2013.01); C08B 11/193 (2013.01)

(58) Field of Classification Search
CPC ............ C08B 1/08; C08B 1/06; C08B 11/02
USPC .......................... 536/124, 61, 85; 106/181.4
See application file for complete search history.

(56) References Cited

U.S. PATENT DOCUMENTS

| 2,054,299 A | 9/1936 | Richter |
| 2,138,014 A | 11/1938 | Richter |
| 2,469,764 A | 5/1949 | Erickson |
| 3,943,233 A | 3/1976 | Swanson et al. |
| 4,117,223 A | 9/1978 | Lodige et al. |
| 4,310,663 A | 1/1982 | Hilbig et al. |
| 4,316,982 A | 2/1982 | Holst et al. |
| 4,363,784 A | 12/1982 | Hilbig et al. |
| 4,410,693 A | 10/1983 | Gibson et al. |
| 4,508,895 A | 4/1985 | Balser |
| 4,612,345 A | 9/1986 | Hess |
| 8,017,766 B2 | 9/2011 | Narita et al. |
| 8,496,782 B2 | 7/2013 | Narita |
| 2007/0144692 A1 | 6/2007 | Narita et al. |
| 2007/0149771 A1 | 6/2007 | Narita et al. |
| 2007/0149772 A1 | 6/2007 | Narita et al. |
| 2007/0149773 A1 | 6/2007 | Narita et al. |
| 2007/0149774 A1 | 6/2007 | Narita et al. |
| 2008/0003429 A1 | 1/2008 | Luo et al. |
| 2009/0071377 A1 | 3/2009 | Wohrmeyer et al. |
| 2009/0165971 A1 | 7/2009 | Narita |
| 2009/0165972 A1 | 7/2009 | Narita |

FOREIGN PATENT DOCUMENTS

| CN | 1990507 A | 7/2007 |
| CN | 101096431 A | 1/2008 |
| EP | 1 734 055 A2 | 12/2006 |
| EP | 1 803 736 A1 | 7/2007 |
| EP | 1 803 737 A1 | 7/2007 |
| EP | 1 803 738 A1 | 7/2007 |
| EP | 1 803 739 A1 | 7/2007 |
| EP | 1 873 302 A2 | 1/2008 |
| EP | 1 878 752 A1 | 1/2008 |
| JP | 35-8347 B | 7/1935 |
| JP | 36-17641 B | 9/1936 |
| JP | 47-003964 B | 2/1972 |
| JP | 47-003965 B | 2/1972 |
| JP | 48-019232 B | 6/1973 |
| JP | 48-026385 B | 8/1973 |
| JP | 53-041356 A | 4/1978 |
| JP | 55-145701 A | 11/1980 |
| JP | 56-002302 A | 1/1981 |
| JP | 3073562 B | 11/1983 |
| JP | 59-056401 A | 3/1984 |
| JP | 60 040101 A | 3/1985 |
| JP | 61-264001 A | 11/1986 |
| JP | 64-085201 A | 3/1989 |
| JP | 10-158302 A | 6/1998 |
| JP | 10-279601 A | 10/1998 |
| JP | 2000-506215 A | 5/2000 |

(Continued)

OTHER PUBLICATIONS

Office Action for Japanese Application No. 2011-034469 dated May 8, 2013.
Office Action for Japanese Application No. 2011-034471 dated May 8, 2013.
Michie, R.I.C., et al.; Kinetic Study of the Autoxidation of Cellulose Suspended in Sodium Hydroxide Solution; Journal of Polymer Science; Part A; vol. 2; 1964; pp. 2063-2083.
Partial Translation of "Cellulose No Jiten (Encyclopedia of Cellulose)", edited by the Cellulose Society of Japan and published on Nov. 10, 2000, 3 pages.
European Search Report for Application No. 12156044.5 dated Jun. 26, 2012.
European Search Report for Application No. 12156043.7 dated Jun. 22, 2012.
European Search Report for Application No. 12156045.2 dated Jun. 18, 2012.
Extended Search Report for Application No. EP 12 15 6041.1 dated Jun. 29, 2012.

(Continued)

*Primary Examiner* — Fereydoun G Sajjadi
*Assistant Examiner* — Everett White
(74) *Attorney, Agent, or Firm* — Alston & Bird LLP

(57) ABSTRACT

Provided is a method for producing cellulose ether whose aqueous solution is transparent and contains a smaller amount of water-insoluble portion. The method comprises at least the steps of: providing at least two alkali cellulose materials having different compositions, each of the materials having been prepared by bringing a pulp into contact with a solution of alkali metal hydroxide and draining; and mixing the at least two alkali cellulose materials having different compositions, wherein each weight ratio of the alkali metal hydroxide in each of the alkali cellulose materials having different compositions to a solid component in the pulp (alkali metal hydroxide/solid component in pulp) is equal to 0.4 to 2.5 times of a weight ratio of alkali metal hydroxide in the alkali cellulose obtained in the step of mixing to solid components in a sum of pulps used for preparation of the alkali cellulose materials.

3 Claims, No Drawings

(56) References Cited

FOREIGN PATENT DOCUMENTS

| | | | |
|---|---|---|---|
| JP | 2001-002701 | A | 1/2001 |
| JP | 2001-302701 | A | 10/2001 |
| JP | 2003-171401 | A | 6/2003 |
| JP | 2003-183301 | A | 7/2003 |
| JP | 2005-008827 | A | 1/2005 |
| JP | 2005-239845 | A | 9/2005 |
| JP | 2006-348177 | A | 12/2006 |
| JP | 2007-197677 | A | 8/2007 |
| JP | 2007-197678 | A | 8/2007 |
| JP | 2007-197679 | A | 8/2007 |
| JP | 2007-197680 | A | 8/2007 |
| JP | 2007-197681 | A | 8/2007 |
| JP | 2007-197682 | A | 8/2007 |
| JP | 4087534 | B2 | 2/2008 |
| JP | 2009-155534 | A | 7/2009 |
| JP | 2009-173907 | A | 8/2009 |
| WO | WO 2007/023513 | A1 | 3/2007 |

OTHER PUBLICATIONS

Office Action for Chinese Application No. 201210038976.9 dated Dec. 4, 2013.
Extended European Search Report from European Application No. 12156046.0, dated Jun. 8, 2012.
Office Action from Japanese Application No. 2011-034472, dated Jul. 8, 2014.
Office Action from Japanese Application No. 2011-034468, dated Jul. 8, 2014.
Office Action from U.S. Appl. No. 13/398,273 dated Aug. 28, 2014.
Office Action from U.S. Appl. No. 13/398,317 dated Aug. 28, 2014.
Office Action from U.S. Appl. No. 13/398,369 dated Aug. 28, 2014.
Office Action from U.S. Appl. No. 13/398,393 dated Sep. 11, 2014.
Office Action for Japanese Application No. 2012-034021 dated Oct. 21, 2014.
Office Action for U.S. Appl. No. 13/398,273 dated Apr. 10, 2015.
Notice of Allowance for U.S. Appl. No. 13/398,317 dated Apr. 23, 2015.
Office Action for U.S. Appl. No. 13/398,369 dated Apr. 23, 2015.
Office Action for U.S. Appl. No. 13/398,393 dated Apr. 23, 2015.

METHOD FOR PRODUCING CELLULOSE ETHER

BACKGROUND OF THE INVENTION

1. Field of the Invention

The present invention relates to a method for efficiently producing water-soluble cellulose ether containing a smaller amount of insoluble fibers.

2. Description of the Related Art

For the preparation of cellulose ether, known is a method of bringing an alkali solution into contact with a highly purified pulp to prepare the corresponding alkali cellulose, and etherifying the resulting alkali cellulose with an etherifying agent. The cellulose ether obtained as a final product becomes water-soluble by properly controlling its degree of substitution. The water-soluble cellulose ether contains a water-insoluble portion which sometimes lowers the light transmittance of the aqueous solution of the cellulose ether or damages the commodity value of the cellulose ether as a contaminant. This insoluble portion appears to be caused by the presence of a low-substituted portion which does not have enough substituents to dissolve in water. One of the reasons why the insoluble portion is present is that an alkali distribution is uneven in the alkali cellulose.

Functions of this alkali include swelling the cellulose therewith to change its crystal structure in the pulp and thereby promoting the penetration of the etherifying agent; catalyzing the etherification reaction with an alkylene oxide; and serving as a reactant for an alkyl halide. A portion of pulp not brought into contact with the aqueous alkali solution is not involved in the reaction and therefore remains as an undissolved portion. Lack of uniformity of the alkali cellulose directly leads to the undissolved portion.

A widely used method for preparing alkali cellulose includes a method comprising the steps of adding an alkali to a powdery pulp, which has been obtained by pulverizing a pulp, in an amount just necessary for the etherification reaction, and mechanically mixing them (Japanese Patent Application Examined Publication No. 60-050801/1985 and Japanese Patent Application Unexamined Publication No. 56-002302/1981). In this method, however, the alkali is not distributed uniformly in the pulp. The pulp not brought into contact with the alkali fails to become cellulose ether and remains in the final product as an unreacted portion, thereby lowering the quality of the cellulose ether.

To avoid such a problem, Japanese Patent Application Unexamined Publication No. 2006-348177 has proposed a method comprising the steps of simultaneously supplying a pulp powder and an aqueous alkali solution to a high speed disperser for continuous contact therebetween to prepare alkali cellulose and reacting the alkali cellulose with an etherifying agent in a reactor. The method still results in cellulose ether containing the pulp not having been contacted with an alkali so that it is not satisfactory with respect to quality of cellulose ether.

Japanese Patent Application Unexamined Publication No. 2007-197682 has proposed a method comprising the steps of continuously bringing pulp into contact with an alkali metal hydroxide solution, draining the obtained contact product with a continuous centrifugal separator to produce alkali cellulose, and reacting the alkali cellulose with an etherifying agent.

SUMMARY OF THE INVENTION

To produce cellulose ether having a constant degree of substitution, alkali cellulose having a constant composition has to be produced constantly. In the method for continuously producing alkali cellulose, however, alkali cellulose having a different composition from an intended composition is often produced in a large amount during adjusting the conditions for producing alkaline cellulose having the intended composition based on information of a composition of currently produced alkali cellulose, resulting in problematic reduction in yield.

Considering such circumstances, the present invention is directed to provide a method for producing cellulose ether whose aqueous solution is transparent and contains a smaller amount of water-insoluble portion.

The present invention provides a method for producing alkali cellulose, comprising at least the steps of:

providing at least two alkali cellulose materials having different compositions, each of the materials having been prepared by bringing a pulp into contact with a solution of alkali metal hydroxide and draining; and mixing the at least two alkali cellulose materials having different compositions, wherein each weight ratio of the alkali metal hydroxide in each of the alkali cellulose materials having different compositions to a solid component in the pulp (alkali metal hydroxide/solid component in pulp) is equal to 0.4 to 2.5 times of a weight ratio of alkali metal hydroxide in the alkali cellulose obtained in the step of mixing to solid components in a sum of pulps used for preparation of the alkali cellulose materials.

The present invention also provides a method for producing cellulose ether, comprising at least a step of reacting the alkali cellulose thus produced with an etherifying agent.

According to the present invention, alkali cellulose having a required composition can be produced by providing stocks of alkali cellulose materials, finding a weight ratio of alkali metal hydroxide to a solid component in the pulp for each of the alkali cellulose materials, and mixing the stocks based on a calculated value. The alkali cellulose ether as a starting material can efficiently produce cellulose ether whose aqueous solution is transparent and contains a smaller amount of water-insoluble portion.

DETAILED DESCRIPTION OF THE PREFERRED EMBODIMENTS

In the present invention, two or more alkali cellulose materials having different compositions are prepared and mixed to obtain alkali cellulose. As used herein, the expression "different composition" means that a different weight ratio of alkali metal hydroxide in each of the alkali cellulose materials to a solid component in the pulp used.

When a weight ratio of alkali metal hydroxide in an alkali cellulose material to a solid component in the pulp used to prepare the alkali cellulose material (alkali metal hydroxide/solid component in pulp) differing from a desired value by 0.05 or more, the alkali cellulose is preferably mixed with at least one alkali cellulose material having a different composition. In a combination of at least two alkali cellulose materials having different compositions, each weight ratio of alkali metal hydroxide in each of the alkaline cellulose materials to a solid component in the pulp used to prepare each of the alkali cellulose materials (alkali metal hydroxide/solid component in pulp) preferably differs from each other at least by 0.1.

From the point of uniformity of substituent distribution, each weight ratio of alkali metal hydroxide in each of at least two alkali cellulose materials to a solid component in the pulp used for preparation of said each of at least two alkali cellulose materials (alkali metal hydroxide/solid component in pulp) is equal to 0.4 to 2.5 times, preferably 0.5 to 2.0 times, more preferably 0.75 to 1.5 times of a weight ratio of alkali metal hydroxide in the alkali cellulose obtained in the step of mixing to solid components in a sum of pulps used for preparation of the alkali cellulose materials (alkali metal hydroxide/solid components in pulps).

A weight ratio of alkali metal hydroxide in alkali cellulose to a solid component in pulp used is determined as the following manner when the alkali metal hydroxide is, for example, sodium hydroxide. First, 4.00 g of a cake is collected and the amount (% by weight: wt %) of the alkali metal hydroxide contained in the cake is determined by neutralization titration (0.5 mol/L $H_2SO_4$, indicator: phenolphthalein). A blank test is also performed in the same manner.

wt % of alkali metal hydroxide=(normality factor)×{(dropped amount (ml) of $H_2SO_4$)−(dropped amount (ml) of $H_2SO_4$ in blank test)}

Using the wt % of the alkali metal hydroxide contained in the cake, (alkali metal hydroxide)/(solid components in pulp) is then determined in accordance with the following equation:

(wt of alkali metal hydroxide)/(wt of solid component in pulp)=(wt % of alkali metal hydroxide)/[{100−(wt % of alkali metal hydroxide)/($B$/100)}×($S$/100)]

In the above equation, B represents the concentration (wt %) of the alkali metal hydroxide solution and "S" represents the concentration (wt %) of the solid component in the pulp. The concentration of the solid component in the pulp is obtained by dividing the dry weight after drying about 2 g of the pulp at 105° C. for 2 hours by the weight of the pulp and then expressing the quotient by wt %. A concentration of solid components in a sum of pulps used for preparation of the alkali cellulose materials can be calculated based on a concentration of a solid component in the pulp used to produce each of the alkali cellulose materials.

According to the invention, a weight ratio of the alkali metal hydroxide in the alkali cellulose produced by mixing at least two alkali cellulose materials having different compositions to solid components in a sum of pulps used to produce the alkali cellulose materials (alkali metal hydroxide/solid component in pulp) is preferably 0.3 to 1.5, more preferably 0.65 to 1.30, still more preferably 0.90 to 1.30.

Pulp used as a starting material generally comprises cellulose and water. A solid component in the pulp is thus cellulose. When the weight ratio is 0.3 to 1.5, the resultant cellulose ether is highly transparent. The solid component of the pulp may comprise, in addition to main cellulose, organic matter such as hemicellulose, lignin and resins, and inorganic matter such as Si and Fe.

Examples of the pulp to be used in the invention include wood pulp and cotton linter pulp. Examples of the wood include needle-leaf trees such as pine, spruce and hemlock and broad-leaf trees such as eucalyptus and maple.

The alkali metal hydroxide solution to be used in the invention is not particularly limited insofar as it can produce alkali cellulose. It is preferably an aqueous solution of sodium hydroxide or potassium hydroxide, particularly preferably an aqueous solution of sodium hydroxide from the economic viewpoint. As a solvent for dissolving the alkali hydroxide therein, water is typically employed, but a lower alcohol (preferably an alcohol having from 1 to 4 carbon atoms) or another inert solvent, or a combination of them may be used.

The concentration of the alkali metal hydroxide solution is preferably from 23 to 60% by weight, more preferably from 35 to 55% by weight. Concentrations less than 23% by weight may be economically disadvantageous since in a subsequent step for obtaining cellulose ether, a side reaction between an etherifying agent and water occurs. In addition, cellulose ether having a desired degree of substitution may not be obtained and an aqueous cellulose ether solution thus prepared may be inferior in transparency. On the other hand, concentrations exceeding 60% by weight may make it difficult to handle the solution because of an increase in its viscosity. It is noted that the concentration of the alkali metal hydroxide solution to be provided for contact with the pulp is preferably kept constant in order to stabilize the composition of the alkali cellulose and ensure transparency of the cellulose ether.

According to the invention, a known method for producing an alkali cellulose material can be employed. Examples of the method include a method comprising a step of spraying or dropping an alkali metal hydroxide solution on a powdered pulp in vessel while being stirred to produce alkali cellulose, and a method comprising the steps of bringing a pulp sheet or chips obtained from the pulp sheet into contact with an excess alkali metal hydroxide and removing a surplus alkali metal hydroxide. For example, pulp is immersed in an excess alkali metal hydroxide solution, and drained to remove a surplus solution of the alkali metal hydroxide. This method includes a method comprising the steps of immersing a pulp sheet in a bath containing an alkali metal hydroxide solution and press-squeezing the immersed pulp sheet with a roller or the other device, and a method comprising the steps of immersing pulp chips in a bath containing an alkali metal hydroxide solution and centrifuging or mechanically squeezing the immersed pulp chips. A particularly preferable method comprises the steps of bringing a pulp sheet or chips obtained from the pulp sheet into contact with an excess alkali metal hydroxide and removing a surplus alkali metal hydroxide.

According to the invention, the alkali cellulose material to be mixed may be produced in a batch process or a continuous process. A continuous process is preferred. A method for continuously producing alkali cellulose material comprising the steps of placing a powdered pulp in a vessel with a stirring mechanism and spraying or dropping an alkali metal hydroxide solution on the powdered pulp with stirring is disclosed, for example, by Japanese Patent Application Unexamined Publication No. 2006-348177. This patent publication describes a method for producing alkali cellulose comprising simultaneously feeding a pulp powder and an aqueous alkali solution to a high-speed disperser for continuous contact therebetween. Another example of the method is described in Japanese Patent Application Unexamined Publication No. 2007-197682. The method of this patent publication comprises the steps of bringing pulp chips into continuous contact with an alkali metal hydroxide solution and draining the obtained contact product with a continuous centrifugal separator to produce alkali cellulose.

Examples of the drainer include a centrifugal separator and a solid-liquid separator by filtration. A centrifugal separator is preferred.

The centrifugal separator employs centrifugal force to separate a solid component from liquid. It may be of a batch type or a continuous type. From the viewpoint of productivity, the continuous type is preferred. Some continuous centrifugal separators have rotators without pores such as a decanter, and others have rotators with pores such as a rotation basket. A continuous centrifugal separator having a rotator without pores gives priority to centrifugal settling, while a continuous centrifugal separator having a rotator with pores utilizes, in addition to centrifugal settling, centrifugal filtration and centrifugal dehydration. The continuous centrifugal separator having a rotator with pores is preferred for easy draining. It is because a true density of cellulose is relatively close to a density of an aqueous caustic soda solution so that a combination of centrifugal settling, centrifugal filtration and centrifugal dehydration is more helpful than centrifugal settling in terms of processing capacity. Examples of the continuous centrifugal separator having a rotator with pores include a centrifugal dehydrator of a self-emptying type, a screw discharge type, a vibration discharge type, and an extrusion plate type. As used herein, the dehydration by dehydrators includes not only removal of "water" but also removal the full range of liquid.

At least two alkali cellulose materials having different compositions of the present invention may be mixed in a batch process or a continuous process. For example, alkali cellulose materials may be mixed in a vessel having a stirring mechanism therein, or in a tumbling mixer. Alkali cellulose materials are preferably mixed in a reactor to be used for subsequently adding an etherifying agent to alkali cellulose, mixing and heating to produce cellulose ether. In this case, it is preferable in terms of investment cost since an extra mixing apparatus is unneeded.

A mixing time, which may depend on the situation of stirring, may be selected to be time for homogenizing at least two alkali cellulose materials having different compositions. The mixing time is typically not less than 1 minute, and preferably not less than 5 minutes.

Using the alkali cellulose obtained by the above-described preparation method as a raw material, cellulose ether can be prepared in a known manner.

The reaction method may include a batch process and a continuous process. The continuous reaction process is preferable because a continuous process is preferably employed for preparation of the alkali cellulose in the invention, but the batch system is also usable.

In the batch process, the alkali cellulose discharged from the drainer may be stored in a buffer tank, or placed directly in an etherification reactor. It is preferable from the standpoint of higher productivity to store the alkali cellulose in the buffer tank and then place it in a reaction vessel within a short time, thereby reducing the occupancy time in the etherification reactor. For suppressing decrease in the degree of polymerization, the buffer tank preferably has an oxygen-free atmosphere by vacuum or nitrogen replacement.

Examples of cellulose ether obtainable from the resulting alkali cellulose as a starting material include alkyl cellulose, hydroxyalkyl cellulose, hydroxyalkylalkyl cellulose and carboxymethyl cellulose.

Examples of the alkyl cellulose include methyl cellulose having a methoxy group (DS) of from 1.0 to 22 and ethyl cellulose having an ethoxy group (DS) of from 2.0 to 2.6. It should be noted that DS represents the degree of substitution and means the average number of hydroxyl groups replaced by a methoxy group per glucose ring unit of cellulose, while MS represents molar substitution and means the average mole of hydroxypropoxy group or hydroxyethoxy group added per glucose ring unit of cellulose.

Examples of the hydroxyalkyl cellulose may include hydroxyethyl cellulose having a hydroxyethoxy group (MS) of from 0.05 to 3.0 and hydroxypropyl cellulose having a hydroxypropoxy group (MS) of from 0.05 to 3.3.

Examples of the hydroxyalkylalkyl cellulose may include hydroxyethylmethyl cellulose having a methoxy group (DS) of from 1.0 to 2.2 and a hydroxyethoxy group (MS) of from 0.1 to 0.6, hydroxypropylmethyl cellulose having a methoxy group (DS) of from 1.0 to 2.2 and a hydroxypropoxy group (MS) of from 0.1 to 0.6, and hydroxyethylethyl cellulose having an ethoxy group (DS) of from 1.0 to 2.2 and a hydroxyethoxy group (MS) of from 0.1 to 0.6.

Examples further include carboxymethyl cellulose having a carboxymethoxy group (DS) of from 0.2 to 2.0.

Examples of the etherifying agent may include alkyl halides such as methyl chloride and ethyl chloride; alkylene oxides such as ethylene oxide and propylene oxide; and monochloroacetic acid.

EXAMPLES

The present invention will be described with reference to Examples, but should not be limited thereto.

Example 1

A powdered pulp and an aqueous 49% by weight sodium hydroxide solution were simultaneously supplied to a high speed disperser such that these came in contact with each other in the disperser and mixed to produce alkali cellulose materials A and B. A weight ratio of alkali metal hydroxide in alkali cellulose material A or B to a solid component in the pulp was determined by the neutralization titration method. As a result, the weight ratios in alkali cellulose materials A and B were 0.50 and 3.13, respectively. Alkali cellulose materials A and B were placed in a pressure-resistant vessel having a stirrer inside thereof at a weight ratio of A/B=0.62 and mixed for 5 minutes. A weight ratio of alkali metal hydroxide in the alkali cellulose obtained by mixing to solid components in the pulps was 1.25. A ratio of (the weight ratio of alkali metal hydroxide in alkali cellulose material A to solid component in pulp) to (the weight ratio of alkali metal hydroxide in the alkali cellulose obtained by mixing to solid components in pulps) was 0.50/1.25=0.40. Similarly calculating, a ratio of (the weight ratio of alkali metal hydroxide in alkali cellulose material B to solid component in pulp) to (the weight ratio of alkali metal hydroxide in the alkali cellulose obtained by mixing to solid components in pulps) was 3.13/1.25=2.50. After vacuuming, the obtained alkali cellulose was subjected to additions of methyl chloride and propylene oxide for reaction. The product was washed, dried, and pulverized to produce hydroxypropylmethyl cellulose.

A degree of substitution of the obtained cellulose ether, and viscosity and transmittance of an aqueous 2% by weight solution thereof at 20° C. are shown in Table 1. The transmittance of an aqueous 2% by weight solution thereof at 20° C. was measured with a photoelectric colorimeter PC-50 using a cell length of 20 mm and a wavelength of 720 nm.

Example 2

Pulp chips were brought into contact with an aqueous 49% by weight sodium hydroxide solution in a pipe type contactor and drained with a V-shaped disc press to produce alkali cellulose materials C and D. A weight ratio of alkali metal hydroxide in alkali cellulose material C or D to a solid component in the pulp was determined by the neutralization titration method. As a result, the weight ratios in alkali cellulose materials C and D were 0.70 and 2.30, respectively. Alkali cellulose materials C and D were placed in a pressure-resistant vessel having a stirrer inside thereof at a weight ratio C/D=0.83 and mixed for 5 minutes. A weight ratio of alkali metal hydroxide in the alkali cellulose obtained by mixing to solid components in pulps was 1.25. A ratio of (the weight ratio of alkali metal hydroxide in alkali cellulose material C to solid component in pulp) to (the weight ratio of alkali metal hydroxide in the alkali cellulose obtained by mixing to solid components in pulps) was 0.70/1.25=0.56. Similarly calculating, a ratio of (the weight ratio of alkali metal hydroxide in alkali cellulose material D to solid component in pulp) to (the weight ratio of alkali metal hydroxide in the alkali cellulose obtained by mixing to solid components in pulps) was 2.30/1.25=1.84. After vacuuming, the obtained alkali cellulose was subjected to additions of methyl chloride and propylene oxide for reaction. The product was washed, dried, and pulverized to produce hydroxypropylmethyl cellulose. The obtained cellulose ether was subjected to measurements of the physical properties in the same way as in Example 1. Results are shown in Table 1.

Example 3

Pulp chips were brought into contact with an aqueous 49% by weight sodium hydroxide solution in a screw-conveyer type contactor and drained with a centrifugal separator to produce alkali cellulose materials E and F. A weight ratio of alkali metal hydroxide in alkali cellulose material E or F to a solid component in the pulp was determined by the neutralization titration method. As a result, the weight ratios in alkali cellulose materials E and F were 1.00 and 1.50, respectively. Alkali cellulose materials E and F were placed in a pressure-resistant vessel having a stirrer inside thereof at a weight ratio E/F=0.75 and mixed for 5 minutes. A weight ratio of alkali metal hydroxide in the alkali cellulose obtained by mixing to solid components in pulps was 1.25.

A ratio of (the weight ratio of alkali metal hydroxide in alkali cellulose material E to solid component in pulp) to (the weight ratio of alkali metal hydroxide in the alkali cellulose obtained by mixing to solid components in pulps) was 1.00/1.25=0.80. Similarly calculating, a ratio of (the weight ratio of alkali metal hydroxide in alkali cellulose material F to solid component in pulp) to (the weight ratio of alkali metal hydroxide in the alkali cellulose obtained by mixing to solid components in pulps) was 1.50/1.25=1.20. After vacuuming, the obtained alkali cellulose was subjected to additions of methyl chloride and propylene oxide for reaction. The product was washed, dried, and pulverized to produce hydroxypropylmethyl cellulose. The obtained cellulose ether was subjected to measurements of physical properties in the same way as in Example 1. Results are shown in Table 1.

Example 4

Pulp chips were brought into contact with an aqueous 49% by weight sodium hydroxide solution in a screw-conveyer type contactor and drained with a centrifugal separator to produce alkali cellulose materials G and H. A weight ratio of alkali metal hydroxide in alkali cellulose material G or H to a solid component in the pulp was determined by the neutralization titration method. As a result, the weight ratios in alkali cellulose materials G and H were 1.20 and 1.30, respectively. Alkali cellulose materials G and H were placed in a pressure-resistant vessel having a stirrer inside thereof at a weight ratio G/H=0.95 and mixed for 5 minutes. A weight ratio of alkali metal hydroxide in the alkali cellulose obtained by mixing to solid components in pulps was 1.25. A ratio of (the weight ratio of alkali metal hydroxide in alkali cellulose material G to solid component in pulp) to (the weight ratio of alkali metal hydroxide in the alkali cellulose obtained by mixing to solid components in pulps) was 1.20/1.25=0.96. Similarly calculating, a ratio of (the weight ratio of alkali metal hydroxide in alkali cellulose material H to solid component in pulp) to (the weight ratio of alkali metal hydroxide in the alkali cellulose obtained by mixing to solid components in pulps) was 1.30/1.25=1.04. After vacuuming, the obtained alkali cellulose was subjected to additions of methyl chloride and propylene oxide for reaction. The product was washed, dried, and pulverized to produce hydroxypropylmethyl cellulose. The obtained cellulose ether was subjected to measurements of physical properties in the same way as in Example 1. Results are shown in Table 1.

Comparative Example 1

Pulp chips were brought into contact with an aqueous 49% by weight sodium hydroxide solution in a pipe type contactor and drained with a V-shaped disc press to produce alkali cellulose I. A weight ratio of alkali metal hydroxide in the alkali cellulose I to a solid component in the pulp was determined by the neutralization titration method. As a result, the weight ratio in alkali cellulose I was 1.25. In order to produce the alkali cellulose having the weight ratio of 1.25, about 5 times as much as each amount of pulp chips, caustic soda, and time required for producing the alkali cellulose in Example 2 were spent because a contact time and a contacting temperature were determined through trial and error. Before the alkali cellulose having the weight ratio of 1.25 was finally produced, unqualified alkali cellulose produced was discarded at a cost of industrial waste disposal. Qualified alkali cellulose was placed in a pressure-resistant vessel having a stirrer inside thereof. After vacuuming, the alkali cellulose was subjected to additions of methyl chloride and propylene oxide for reaction. The product was washed, dried, and pulverized to produce hydroxypropylmethyl cellulose. The obtained cellulose ether was subjected to measurements of physical properties in the same way as in Example 1. Results are shown in Table 1.

Comparative Example 2

Pulp chips were brought into contact with an aqueous 49% by weight sodium hydroxide solution in a pipe type contactor and drained with a V-shaped disc press to produce alkali cellulose materials J and K. A weight ratio of alkali metal hydroxide in alkali cellulose material J or K to a solid component in the pulp was determined by the neutralization titration method. As a result, the weight ratios in alkali cellulose materials J and K were 0.45 and 3.30, respectively. Alkali cellulose materials J and K were placed in a pressure-resistant vessel having a stirrer inside thereof at a weight ratio J/K=2.57 and mixed for 5 minutes. A weight ratio of alkali metal hydroxide in the alkali cellulose obtained by mixing to solid components in pulps was 1.25. A ratio of (the weight ratio of alkali metal hydroxide in alkali cellulose material J to solid component in pulp) to (the weight ratio of alkali metal hydroxide in the alkali cellulose obtained by mixing to solid components in pulps) was 0.45/1.25=0.36. Similarly calculating, a ratio of (the weight ratio of alkali metal hydroxide in alkali cellulose material K to solid component in pulp) to (the weight ratio of alkali metal hydroxide in the alkali cellulose obtained by mixing to solid components in pulps) was 3.30/125=2.64. After vacuuming, the obtained alkali cellulose subjected to additions of methyl chloride and propylene oxide for reaction. The product was washed, dried, and pulverized to produce hydroxypropylmethyl cellulose. The obtained cellulose ether was subjected to measurements of physical properties in the same way as in Example 1. Results are shown in Table 1.

TABLE 1

| | alkali cellulose material | X | Y | X/Y | cellulose ether methoxy group (DS) | cellulose ether hydroxypropoxy group (MS) | 20° C. viscosity (mPa·s) | aqueous 2% by weight cellulose ether solution 20° C. transmittance (%) |
|---|---|---|---|---|---|---|---|---|
| Example 1 | A | 0.50 | 125 | 0.40 | 1.90 | 0.24 | 9000 | 95.0 |
| | B | 3.13 | | 2.50 | | | | |
| Example 2 | C | 0.70 | 1.25 | 0.56 | 1.90 | 0.24 | 11000 | 97.0 |
| | D | 2.30 | | 1.84 | | | | |
| Example 3 | E | 1.00 | 1.25 | 0.80 | 1.90 | 0.24 | 10000 | 98.0 |
| | F | 1.50 | | 1.20 | | | | |
| Example 4 | G | 1.20 | 1.25 | 0.96 | 1.90 | 0.24 | 12000 | 98.5 |
| | H | 1.30 | | 1.04 | | | | |
| Comp. Ex. 1 | I | 1.25 | 1.25 | 1.00 | 1.90 | 0.24 | 12000 | 98.5 |
| Comp. Ex. 2 | J | 0.45 | 1.25 | 0.36 | 1.90 | 0.24 | 8000 | 93.0 |
| | K | 3.30 | | 2.64 | | | | |

\* X represents a weight ratio of alkali metal hydroxide in alkali cellulose material to a solid component in the pulp.
\* Y represents a weight ratio of alkali metal hydroxide in the alkali cellulose obtained by mixing to solid components in pulps.

The invention claimed is:

1. A method for producing cellulose ether, comprising at least the steps of:
providing at least two alkali cellulose materials having different compositions, each of the materials having been prepared by bringing a pulp into contact with a solution having an alkali metal hydroxide concentration of 23 to 60% by weight and draining;
mixing the at least two alkali cellulose materials having different compositions to obtain alkali cellulose, and
reacting the alkali cellulose with an etherifying agent,
wherein each weight ratio of the alkali metal hydroxide in each of the alkali cellulose materials having different compositions to a solid component in the pulp used to prepare the respective alkali cellulose material (alkali metal hydroxide/solid component in pulp) is equal to 0.4 to 2.5 times a weight ratio of alkali metal hydroxide in the alkali cellulose obtained in the step of mixing to a sum of the solid components in the pulps used for preparation of the alkali cellulose materials.

2. The method for producing cellulose ether according to claim 1, wherein the weight ratio of the alkali metal hydroxide in the alkali cellulose obtained in the step of mixing to the solid components in the sum of the solid components in the pulps is 0.3 to 1.5.

3. The method for producing cellulose ether according to claim 1, wherein each weight ratio of the alkali metal hydroxide in each of the alkali cellulose materials having different compositions to a solid component in the pulp (alkali metal hydroxide/solid component in pulp) differs from the other at least by 0.1.

* * * * *